United States Patent
Chao et al.

(10) Patent No.: US 11,597,802 B2
(45) Date of Patent: Mar. 7, 2023

(54) FOAM CONTROL COMPOSITION

(71) Applicant: Dow Silicones Corporation, Midland, MI (US)

(72) Inventors: Sung-Hsuen Chao, Seneffe (BE); Christophe Deglas, Seneffe (BE); Marc Thibaut, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/756,770

(22) PCT Filed: Jan. 19, 2021

(86) PCT No.: PCT/US2021/013886
§ 371 (c)(1),
(2) Date: Jun. 2, 2022

(87) PCT Pub. No.: WO2021/167728
PCT Pub. Date: Aug. 26, 2021

(65) Prior Publication Data
US 2023/0037257 A1 Feb. 2, 2023

Related U.S. Application Data

(60) Provisional application No. 62/978,982, filed on Feb. 20, 2020.

(51) Int. Cl.
| | | |
|---|---|---|
| *B01D 19/04* | (2006.01) | |
| *C08G 77/38* | (2006.01) | |
| *C08G 77/20* | (2006.01) | |
| *C08K 3/36* | (2006.01) | |
| *C08G 77/12* | (2006.01) | |
| *C08G 77/00* | (2006.01) | |

(52) U.S. Cl.
CPC .......... *C08G 77/38* (2013.01); *B01D 19/0409* (2013.01); *C08G 77/12* (2013.01); *C08G 77/20* (2013.01); *C08K 3/36* (2013.01); *C08G 77/70* (2013.01)

(58) Field of Classification Search
CPC .... B01D 19/0409; C08G 77/12; C08G 77/20; C08L 83/04; B01J 23/40; B01J 23/00
See application file for complete search history.

(56) References Cited

U.S. PATENT DOCUMENTS

| | | | |
|---|---|---|---|
| 3,383,327 A | 5/1968 | Sullivan et al. | |
| 3,455,839 A | 7/1969 | Rauner et al. | |
| 3,963,627 A | 6/1976 | Cottrell | |
| 4,593,049 A | 6/1986 | Bauman et al. | |
| 4,741,861 A | 5/1988 | Okada et al. | |
| 4,749,740 A | 6/1988 | Aizawa et al. | |
| 5,153,258 A | 10/1992 | Nakahara et al. | |
| 6,521,586 B1 | 2/2003 | Hoogland et al. | |
| 6,656,975 B1 | 12/2003 | Christiano et al. | |
| 6,899,951 B2 | 5/2005 | Panz et al. | |
| 7,776,929 B2 | 8/2010 | Schneider et al. | |
| 8,053,480 B2 | 11/2011 | Hilberer et al. | |
| 8,530,401 B2 | 9/2013 | Becker et al. | |
| 8,536,109 B2 | 9/2013 | Delbrassinne et al. | |
| 8,614,256 B2 | 12/2013 | Panz et al. | |
| 9,114,333 B2 | 8/2015 | Burger et al. | |
| 9,631,320 B2 | 4/2017 | Chao et al. | |
| 9,976,105 B2 | 5/2018 | Barnes et al. | |
| 2009/0306282 A1 | 12/2009 | Hilberer et al. | |
| 2017/0218307 A1 | 8/2017 | Panandiker et al. | |
| 2019/0291024 A1 | 9/2019 | Rahma et al. | |

FOREIGN PATENT DOCUMENTS

| | | |
|---|---|---|
| CN | 104436766 A | 3/2015 |
| CN | 105498304 A | 4/2016 |
| EP | 0047630 A1 | 3/1982 |

(Continued)

OTHER PUBLICATIONS

Search Report from corresponding Chinese Application No. 202180014717.X dated Nov. 9, 2022.

*Primary Examiner* — Kuo Liang Peng
(74) *Attorney, Agent, or Firm* — Edward Black

(57) ABSTRACT

Foam control compositions along with formulations thereof and their use in various applications, including a method for making a foam control composition comprising a cross-linked polyorganosiloxane material including a dispersed silica filler, including the steps of:

A) preparing a hydrosilylation reaction mixture by combining the following components: (i) silica filler, (ii) a polyorganosiloxane having at least two reactive substituents capable of addition reaction with component (iii) via hydrosilylation, (iii) a polyorganosiloxane having at least three reactive substituents capable of addition reaction with component (ii) via hydrosilylation, and (iv) a hydrosilylation catalyst;

B) conducting a hydrosilylation reaction of components (ii) and (iii) until the reaction mixture at least partially gels to form a hydrosilylation reaction product;

C) shearing the hydrosilylation reaction product of step B); and

D) combining the hydrosilylation reaction product of step C) with a (v) silicone resin and an (vi) condensation catalyst to form a condensation reaction mixture and conducting a condensation reaction between the (v) silicone resin and the hydrosilylation reaction product of step C) to form a condensation reaction product.

9 Claims, No Drawings

(56) References Cited

FOREIGN PATENT DOCUMENTS

| | | | |
|---|---|---|---|
| EP | 0217501 | A2 | 4/1987 |
| EP | 0270273 | A2 | 6/1988 |
| EP | 0516109 | * | 5/1992 |
| EP | 0516109 | A1 | 12/1992 |
| GB | 1296308 | A | 11/1972 |
| GB | 2257709 | A | 1/1993 |

* cited by examiner

FOAM CONTROL COMPOSITION

CROSS REFERENCE TO RELATED APPLICATIONS

This application claims the benefit of U.S. Provisional Patent Application Ser. No. 62/978,982 filed on 20 Feb. 2020 under 35 U.S.C. § 119 (e). U.S. Provisional Patent Application Ser. No. 62/978,982 is hereby incorporated by reference.

FIELD

This invention is directed toward foam control compositions including cross-linked polyorganosiloxanes dispersed with silica fillers along with methods for making and using the same.

INTRODUCTION

Foam control compositions including cross-linked polyorganosiloxanes dispersed with silica filler are known in the art. A primary application is their use in foaming processes operated at high or low pH values (e.g. above pH 12 or below pH 3) and/or at temperatures above ambient. Applicable processes include paper making and pulping processes (e.g. Kraft pulping process), textile dyeing processes, metal working processes, waste water treatment processes, natural gas scrubbing processes along with the production of inks, coatings, paints and detergents. One particularly successful foam control composition is described in U.S. Pat. No. 8,053,480. This reference describes a foam control composition made by conducting a hydrosilylation reaction between reactive polyorganosiloxanes with dispersed finely divided hydrophobic silica, i.e. A) mixing, before step (B): (i) a silica filler, (ii) a polyorganosiloxane having at least two reactive substituents capable of addition reaction with component (iii) via hydrosilylation, and (iii) a polyorganosiloxane having at least three reactive substituents, capable of addition reaction with component (ii) via hydrosilylation; B) followed by causing hydrosilylation reaction of components (ii) and (iii) in the presence of a hydrosilylation catalyst wherein the hydrosilylation reaction is conducted until the mixture at least partially gels, and then C) shearing the partially gelled material. While the resulting material is an effective foam control composition, there is continued interest in developing foam control compositions offering improved foam control performance at lower addition levels.

SUMMARY

The present invention includes foam control compositions comprising cross-linked polyorganosiloxanes dispersed with silica filler along with methods for making and using the same. The subject method builds upon the approach described in U.S. Pat. No. 8,053,480 but importantly subjects the described hydrosilylation reaction product to a subsequent condensation reaction with a silicon resin in the presence of a condensation catalyst to form a condensation reaction product. This condensation reaction product has a lower viscosity as compared to the aforementioned hydrosilylation reaction product and in most instance offers improved persistence and/or improved foam control performance at lower addition (concentration) levels.

In one aspect, the present invention includes a method for making a foam control composition comprising a cross-linked polyorganosiloxane material including a dispersed silica filler, comprising the steps of:

A) preparing a hydrosilylation reaction mixture by combining the following components: (i) silica filler, (ii) a polyorganosiloxane having at least two reactive substituents capable of addition reaction with component (iii) via hydrosilylation, (iii) a polyorganosiloxane having at least three reactive substituents capable of addition reaction with component (ii) via hydrosilylation, and (iv) a hydrosilylation catalyst;

B) conducting a hydrosilylation reaction of components (ii) and (iii) until the reaction mixture at least partially gels to form a hydrosilylation reaction product;

C) shearing the hydrosilylation reaction product of step B); and

D) combining the hydrosilylation reaction product of step C) with a (v) silicone resin and an (vi) condensation catalyst to form a condensation reaction mixture and conducting a condensation reaction between the (v) silicone resin and the hydrosilylation reaction product of step C) to form a condensation reaction product.

In another aspect of the invention, the (i) silica filler comprises both hydrophobic and hydrophilic silica. In another aspect of the invention, the (i) silica filler comprises both fumed and precipitated silica.

A number of additional embodiments are described including foam control compositions per se along with formulations thereof and their use in various applications

DETAILED DESCRIPTION

As mentioned in the Summary, the method of the present invention builds upon the approach described in U.S. Pat. No. 8,053,480 which is incorporated herein in its entirety. In brief, the present method involves preparing of A) hydrosilylation reaction mixture, B) conducting a hydrosilylation reaction to form a hydrosilylation reaction product, C) shearing the hydrosilylation reaction product and D) combining the hydrosilylation reaction product of step C) with a silicone resin and an condensation catalyst to form a condensation reaction mixture and conducting a condensation reaction between the silicone resin and the hydrosilylation reaction product to form a condensation reaction product. Steps A), B) and C) may be conducted in the manner as described in U.S. Pat. No. 8,053,480, or in accordance with the expanded description provided herein. For example, the steps of preparing the hydrosilylation reaction mixture may involve the combination and mixing of the individual components (i), (ii), (iii) and (iv) in any particular order although the specific order described below is preferred. Mixing may optionally include the use of solvents include silicone oils such as PDMS, water insoluble organic compounds that are liquids at 25° C. or mixtures thereof. Step B) is preferably substantially initiated after the substantial mixing of the components of the hydrosilylation reaction mixture in order to ensure a more uniform hydrosilylation reaction product. For example, in order to ensure that the (i) finely divided silica filler will be uniformly dispersed within the hydrosilylation reaction product, the silica filler is preferably combined and mixed with the bulk of either polyorganosiloxane (ii) or (iii) prior to substantial reaction. With that said, those skilled in the art will appreciate that some degree of reaction may occur prior to complete mixing and that steps A) and B) may overlap, i.e. mixing may occur simultaneous with reaction. The substantial initiation of the reaction in step B) may be controlled by the staged addition of the individual components, i.e. with the hydrosilylation catalyst and/or SiH containing polymer being added last. As will be described, the hydrosilylation is preferably substantially initiated by heating the hydrosilylation reaction mixture. As such, the step of heating may be staged to occur after substantial mixing of the hydrosilylation reaction mixture or simultaneously with the addition (and co-mixing) of certain components as described below, e.g. the hydrosilylation catalyst and/or SiH containing polymer.

In step A), a hydrosilylation reaction mixture is prepared which includes the following components: (i) silica filler, (ii) a polyorganosiloxane having at least two reactive substituents capable of addition reaction with component (iii) via hydrosilylation, (iii) a polyorganosiloxane having at least three reactive substituents capable of addition reaction with component (ii) via hydrosilylation, and (iv) a hydrosilylation catalyst; each of which is describe below.

(i) Silica Filler:

The finely divided silica filler used in the invention is not particularly limited and includes precipitated, calcined, thermal, aerogel and fumed (pyrogenic) varieties. Such silica fillers may be prepared according to conventional manufacturing techniques, e.g. thermal decomposition (pyrolysis) of a silicon halide, a decomposition and precipitation of a metal salt of silicic acid, e.g. sodium silicate, and a gel formation method. Preferred silicas included precipitated silica and fumed silica, both of which may be hydrophilic or pretreated hydrophobic silicas. Applicable precipitated silicas preferably have BET surface area of 50-200 $m^2/g$ measured according ISO 5794/1 (2010). Fumed silicas preferably have BET surface area of 100 to 400 $m^2/g$, most preferably 100 to 300 $m^2/g$ as measured according to DIN 66131. Applicable silica fillers preferably having an average particle size, i.e. mean volume-weighted diameter (sometimes indicated as: "Dv50" or "$Dv_{0.5}$") of 0.1 to 100 µm but more preferably is from 0.5 to 25 µm as determined by the dry method, i.e. dry dispersion analysis, pursuant to ISO 13320 (2009), (laser diffraction) using a Mastersizer™ 3000 laser diffraction particle size analyzer connected to the dry dispersion 'Aero M' from Malvern Instruments.

In one embodiment, the silica filler used in the present invention consists solely of pre-treated hydrophobic silica (consistent with the approach described in U.S. Pat. No. 8,053,480). Commercial examples of applicable hydrophobic fumed silicas include: HDK® H2000 and HDK® H15 (Wacker Chemie AG), AEROSIL® 972 and AEROSIL® 805 (Evonik Degussa GmbH) and CAB-O-SIL® TS-720 and TS-530 (Cabot GmbH). Additional commercial examples of applicable hydrophobic precipitated silicas include: Sipernat® D10, Sipernat® D13 and Sipernat® D17 (Evonik Degussa GmbH) and Zeoflo TL (Grace GmbH & Co. KG, Worms).

In an alternative embodiment, the silica filler used in the present invention comprises a combination of both hydrophobic and hydrophilic silica. Preferred weight ratios of hydrophobic silica to hydrophilic silica include from: 95:5 to 5:95, 90:10 to 10:90 and 90:10 to 50:50. Commercial examples of applicable hydrophilic fumed silicas include: HDK® N 20, HDK® S13, and HDK® T30 (Wacker Chemie AG, Munich), AEROSIL® 200 (Evonik Degussa GmbH) and Cab-O-Sil® LM 150 (Cabot GmbH). Commercial examples of applicable hydrophilic precipitated silicas include: Sipernat® 383 DS and Sipernat® 160 PQ (Evonik Degussa GmbH) and Syloid® 244 FP and Zeofoam (Grace GmbH & Co. KG, Worms).

In yet another alternative embodiment, the silica filler used in the present invention comprises a combination of both fumed and precipitated silica.

As used herein, the term "hydrophobic" as used with respect to silica refers to silicas that have been rendered hydrophobic, e.g. by chemical treatment with hydrophobizing agents such as reactive silanes or siloxanes, e.g. dimethyldichlorosilane, trimethylchlorosilane, hexamethyldisilazane, hydroxyl end-blocked and methyl end-blocked polydimethylsiloxanes, siloxane resins, fatty acids or a mixture of one or more of these. Silicas whose surfaces have been modified with hydrophobizing agents are poorly wetted by water but can be wetted with a methanol/water mixture. The degree of hydrophobicity is commonly characterized by the fraction of methanol to water (expressed as wt % of methanol) required to wet the silica (i.e. "methanol wettability"). The higher the methanol fraction, the higher degree of hydrophobization of the silica. An art recognized method for measuring hydrophobicity is described in U.S. Pat. No. 6,899,951 and is incorporated herein. In brief: 200 mg of a silica is placed into each of six graduated transparent centrifugal tubes each having a capacity of 15 ml. 8 ml of a methanol/water mixture is added to each tube with the methanol concentration of each mixture being increased for each successive tube (e.g. 10 percent by volume of methanol to 90 percent by volume methanol). Initial selection of methanol concentrations of each mixture is guided by the anticipated methanol wettability. The centrifuge tubes are tightly closed and shaken vigorously (e.g. for 30 seconds in a shaking mixer tubule, i.e. at least 10 up-and-down movements). To separate the wetted silica fractions, the tubes are then centrifuged at 2500 rpm for 5 minutes. The wetted fractions form a sediment whose volume can be read off on the graduated scale on the centrifuge tubes. The sediment volumes are plotted against the methanol/water mixture concentration (methanol content by volume). The individual measurement points produce a curve (x axis: percentage fraction of methanol in the methanol/water mixtures, y axis: height of sediment) whose position and slope characterizes the degree of hydrophobicity. The hydrophobization of the x-axis value (wt %) at the point of inflection of the curve is reported. For purposes of the present invention, the hydrophobic silica preferably has methanol wettability of at least 20% by weight of methanol, e.g. 20% to 70% and more preferably 30-60% by weight of methanol. The hydrophobicity of silica can be further characterized by the carbon content measured by oxidation of carbon in a sample through combustion with the resulting $CO_2$ being measured by infrared (IR) detectors (ISO 3262-20) as described in U.S. Pat. No. 8,614,256 which is incorporated herein by reference. Preferred hydrophobic silicas having carbon content of 0.2% to 7% by weight and most preferably from 0.5% to 4% by weight.

Hydrophilic silicas applicable for use in the present invention preferably have methanol wettability of equal to or less than 10% by weight of methanol, e.g. 0 to 10 wt % and more preferably from 0 to 5% by weight of methanol. By way of an additional or alternative characterization, hydrophilic silicas applicable for use in the present invention have a carbon content below 0.1% by weight as determined by the above-mentioned methodology.

(ii) and (iii) Polyorganosiloxanes:

The reactive substituents of polyorganosiloxane components (ii) and (iii) are silicon bonded hydrogen atoms and silicon-bonded aliphatically unsaturated hydrocarbon groups where the unsaturation is between terminal carbon atoms of said group. It is not important whether the silicon-bonded hydrogen groups or the unsaturated groups are on component (ii) or on component (iii), provided one is predominantly, preferably solely, found on component (ii)

and the other is predominantly, preferably solely, found on component (iii). Although component (ii) may comprise some branching or some pending siloxane units on a predominantly linear backbone, it is most preferred that component (ii) is a linear polyorganosiloxane material. It is particularly preferred that the reactive substituents are located on the terminal silicon atoms of the polyorganosiloxane. With regard to component (iii), it is not critical whether this is a linear, branched, resinous or cyclic polyorganosiloxane material. It is preferred that the reactive groups are spaced in the polymer in such a way that they are substituted on different silicon atoms, preferably sufficiently far apart to enable easy reaction with a number of polyorganosiloxane materials of component (ii). It is preferred that the silicon-bonded aliphatically unsaturated hydrocarbon groups are alkenyl groups, preferably vinyl or allyl groups, most preferably vinyl groups. While the description which follows will use the option of component (ii) having the aliphatically unsaturated hydrocarbon groups as substituents and component (iii) having the silicon bonded hydrogen atoms, it will be understood that the reverse situation is equally applicable.

The preferred component (ii) for use in step (A) of the subject method is a vinyl end-blocked polydiorganosiloxane having the general formula: Vi-[Si($R_2$)O]$_n$—Si($R_2$)Vi, wherein R denotes a monovalent organic group and Vi denotes a vinyl group. The organic group R is preferably a hydrocarbon group of up to 8 carbon atoms, more preferably an alkyl group or an aryl group, e.g. methyl, ethyl, propyl, hexyl or phenyl. It is particularly preferred that at least 80% of all R groups are methyl groups, most preferably 100%. The value of n, which denotes an integer, is such that the viscosity of the vinyl end-blocked polydiorganosiloxane is in the range of from 200 to 100,000 cP (mPa·s), more preferably 2000 to 55,000 cP at a temperature of 25° C.

The preferred component (iii) for use in step (A) is a polyorganosiloxane having silicon-bonded hydrogen atoms, also sometimes referred to as a polyorganohydrogensiloxane, which may be cyclic, linear, branched or resinous, or may be a mixture including two or more of such polyorganohydrogensiloxanes. The viscosity of component (iii) is such that it is substantially lower than that of component (ii), preferably no more than 1000 cP at 25° C. Suitable cyclic polyorgano hydrogensiloxanes include those of the formula (RR'SiO)$_x$ in which R is as defined above and R' is an R group or a hydrogen atom, provided there are at least three silicon atoms which have a hydrogen atom substituted thereon and x is an integer with a value of from 3 to 10. Preferably R is an alkyl or aryl radical having from 1 to 6 carbon atoms preferably methyl, each R' is hydrogen and x is an integer from 3 to 5. Suitable linear polyorganohydrogensiloxanes for use as component (iii) include those of the general formula R'$_3$SiO(RR'SiO)$_y$SiR'$_3$ where R and R' are the same as defined above and y is from 2 to 300, preferably 2 to 40 and more preferably 3 to 25, provided there are at least 3 silicon-bonded hydrogen atoms per molecule. Resinous or branched polyorganohydrogensiloxane materials for use as component (iii) have a three-dimensional structure and may include monovalent (R'$_3$SiO$_{1/2}$) units, divalent (R'$_2$SiO$_{2/2}$) units, trivalent (R'SiO$_{3/2}$) units and/or tetravalent (SiO$_{4/2}$) units, wherein R' has the same meaning as identified above, provided there are at least 3 silicon-bonded hydrogen groups per molecule. The preferred resinous polyorganohydrogensiloxane materials for use as component (iii) have a weight average molecular weight (Mw) of no more than 15,000. It is particularly preferred that component (iii) has from 3 to 10, most preferred 3 to 5 silicon-bonded hydrogen atoms per molecule, with each hydrogen atom being substituted on a different silicon atom.

As indicated above, components (ii) and (iii) may include the SiH groups and the preferred Si-alkenyl functionality respectively, instead of the ones specifically described above. In such case, component (ii) may be a polyorganohydrogensiloxane, preferably a polydialkylsiloxane having terminal SiH groups, for example a polydimethylsiloxane having terminal dimethylhydrogensiloxane units and a viscosity at 25° C. of from 200 to 100,000 preferably from 2000 to 55,000 cP. Additionally, component (iii) could be for example a resinous material having mono-functional units (R"$_3$SiO$_{1/2}$), difunctional units (R"2SiO$_{2/2}$), trifunctional units (R"SiO$_{3/2}$) and tetrafunctional units (SiO$_{4/2}$) wherein R" denotes a group R or a monovalent unsaturated aliphatic hydrocarbon group. Some OH groups may also be substituted onto some silicon atoms. A particularly preferred resinous material is a vinyl substituted siloxane resin having mainly mono-functional and tetrafunctional units, a weight average molecular weight (Mw) of about 5,000 and an average of 3 to 5 vinyl units substituted on different silicon atoms.

As is known in the art, the ratio of components (ii) and (iii) should be selected so that the hydrosilylation reaction is well controlled. By choosing the appropriate level of reactive groups of each type, the cross-linking and branching density can be controlled. In addition, by using an excess of one functional group, preferably the aliphatically unsaturated hydrocarbon group, the amount of unreacted groups in the final branched or cross-linked polyorganosiloxane can be controlled. Preferably the ratio of the number of SiH groups to aliphatically unsaturated Si-bonded hydrocarbon groups is in the range of from 1/10 to 10/1, more preferably the ratio will be from 1/5 to 5/1, most preferably 1/3 to 1/1. Applicable vinyl functional polyorganosiloxanes are well known and commercially available. Representative commercial examples include: SILASTIC™ SFD 128, SILASTIC™ SFD-120, and DOWSIL™ SFD-119, all of which are available from The Dow Chemical Company. Applicable SiH functional polyorganosiloxanes are also well known and include: DOWSIL™ 1-8114, XIAMETER™ MHX-1107 Fluid, XIAMETER™ OFX-5057 Fluid, DOWSIL™ 1-3502 Polymer, SYL-OFF™ 7672, SYL-OFF™ 7678 and DOWSIL™ 6-3570 polymer, all available from the Dow Chemical Company.

(iv) Hydrosilylation Catalyst:

The selection of the hydrosilylation catalyst is not particularly limited but in most embodiments the catalyst includes platinum, rhodium, iridium, palladium, ruthenium or combinations thereof. The hydrosilylation catalyst may be for example, a fine platinum powder, platinum black, platinum acetylacetonate, chloroplatinic acid, an alcoholic solution of chloroplatinic acid, an olefin complex of chloroplatinic acid, a complex of chloroplatinic acid and alkenylsiloxane (e.g. divinyltetramethyl disilazane diluted in dimethylvinylsiloxy end-blocked polydimethylsiloxane which may be prepared according to methods described in U.S. Pat. No. 3,419,593), a complex of platinous chloride and divinyl tetramethyl disiloxane as described in U.S. Pat. No. 5,175,325, or a thermoplastic resin that includes the aforementioned platinum catalyst. In other embodiments the hydrosilylation catalyst is a platinum vinyl siloxane complex such as Karstedt's catalyst or Speier's catalyst or combinations thereof. Specific Karstedt's catalyst are described in U.S. Pat. Nos. 3,715,334 and 3,814,730. Additional examples of applicable catalyst are described in the following: U.S. Pat. Nos. 2,823,218, 3,419,359, 3,445,420, 3,697,473, 3,814,731, 3,890,359 and 4,123,604. The hydrosilylation catalyst may be a single catalyst or a combination of two or more catalysts. Many of these hydrosilylation catalysts require the reactants to be heated in order for a significant reaction to occur.

The concentrations of hydrosilylation catalyst to be used in the present invention may be determined by routine experimentation. Typically an effective amount of catalyst is in a range so as to provide from 0.1 to 1000 parts per million (ppm) of the actual metal (e.g. platinum) by weight based on the weight of components (ii) and (iii) combined in the mixture used in step (B) of the process according to the present invention. All of these materials are well known in the art and are commercially available, e.g. chloroplatinic acid and SYL-OFF™ 4000 catalyst.

In step A) chain extenders may optionally be included in the hydrosilylation reaction mixture. These are materials similar to component (ii) and are preferably substantially linear polyorganosiloxane materials where the reactive group is present at the terminal silicon atoms of the polyorganosiloxane. These materials perform the role of taking part in the hydrosilylation reaction but with the effect of spacing out locations where the final polyorganosiloxane is branched. As such, it is preferably that the reactive group of the chain extender is the same as the reactive group of component (iii). Examples of suitable chain extenders include α,ω-divinyl polydimethylsiloxane when component (iii) includes aliphatically unsaturated hydrocarbon reactive groups.

It is optional but preferred that the hydrosilylation reaction mixture include a solvent (also referred to here as a "diluent") such as a polydiorganosiloxane or a water insoluble organic compound. Suitable polydiorganosiloxane solvents are substantially linear or cyclic polymers, although mixtures thereof can also be used, wherein the silicon-bonded substituents are groups R, as defined above. Most preferably at least 80% of all silicon-bonded substituents are alkyl groups, preferably methyl groups.

Most preferred solvents include trimethylsiloxy end-blocked polydimethylsiloxanes (PDMS) having a viscosity of from 50 to 30,000 cP, more preferably 500 to 5000 cP measured at 25° C. Other preferred solvents include water insoluble organic compounds that are liquids at 25° C. Preferred water insoluble organic solvents or diluents include aliphatic hydrocarbons such as mineral oil, white oil, liquid polyisobutene, isoparaffinic oil or petroleum jelly along with blends thereof, most preferred have boiling point above 100° C. and flash point above 100° C. Mixtures of the foregoing can also be used. The solvents or diluents are mainly present to solubilize the branched or cross-linked polyorganosiloxane made in step (B) of the process of the invention, which is particularly useful for the higher viscosity branched or cross-linked polydiorganosiloxanes. The amount of solvent which can be used may vary widely and it is preferred that larger amounts of solvent are used where the branched or cross-linked polyorganosiloxane has itself a higher viscosity. The amounts of solvent or diluent used could be as high as 90 w % based on the total formulation of the hydrosilylation reaction mixture, but preferably from 30 to 80 wt % is used.

During step B), components (ii) and (iii) are caused to react by hydrosilylation in the presence of a hydrosilylation catalyst. It is possible to combine the catalyst at the same time as components (i) to (iii) but if this is done it is preferred that a method is used of halting the activity of the catalyst until the process is ready to proceed. Such options include the use of an inhibitor and the use of physical separation, such as encapsulation which is undone immediately prior to starting step B) of the process. Alternatively and more preferably, the hydrosilylation catalyst is added in immediately prior to starting step B), which may be done by any known means and will require some efficient dispersion of the catalyst into the hydrosilylation reaction mixture. It is particularly preferred to prepare the mixture of step (A) along with heating to a temperature to enable the hydrosilylation reaction to occur, at which stage the catalyst, either neat or in diluted form (for example in a small portion of component (ii) or (iii), preferably the component having the aliphatically unsaturated hydrocarbon substituents or in a small portion of a diluent or solvent as discussed below) is introduced and mixed to form a dispersion in the mixture.

The hydrosilylation reaction for forming the branched or cross-linked polyorganosiloxane using the preferred components (ii) and (iii) in step (B) of the can be represented as follows: —SiCH=CH$_2$+HSi—→—SiCH$_2$CH$_2$Si—. The reaction is preferably conducted by blending the vinyl end-blocked polydiorganosiloxane, polyorganohydrogensiloxane and optional a solvent or diluent and to bring that blended mixture up to the required reaction temperature, at which time the hydrosilylation catalyst is added to enable the reaction. Applicable solvents or diluents include silicone oils such as PDMS having a viscosity from 50 to 30,000 cP at 25° C., but more preferably from 500 to 5000 cP, liquid aliphatic hydrocarbons such as white oil, polyisobutene along with blends thereof. The hydrosilylation reaction may occur at ambient temperature but is preferably carried out at a temperature of from 30 to 120° C. and more preferably about 40 to 100° C. Preferably where component (ii) is the aliphatically unsaturated hydrocarbon group containing polyorganosiloxane, e.g. the vinyl end-blocked polydiorganosiloxane, it is included in the reactant solution in an amount of up to 98 wt %, preferably 80 to 92 wt % based on the weight of total of components (i), (ii), (iii) and (iv), (i.e. excluding the weight of any solvents, diluents or optional components). On the same basis, the amount of silica filler (i) is from 2 to 15 wt % more preferably from 2 to 8 wt %; and the amount of component (iii) is from 0.1 to 5 wt %. The concentrations of the hydrosilylation catalyst may be determined by routine experimentation. Typically, the effective amount of catalyst should be in a range so as to provide from 0.1 to 1000 parts per million (ppm) of the actual metal (e.g. platinum) by weight based on the weight of components (ii) and (iii) combined in the mixture used in step (B) of the process according to the present invention.

The hydrosilylation reaction product (i.e. cross-linked polyorganosiloxane) prepared in step B) has a three dimensional network that is preferably partially gelled and has a viscosity of from 1,000,000 cP to 50,000,000 cP as measured at a shear rate of 1 s$^{-1}$ and a temperature of 25° C. using a viscometer (Brookfield DV2-HB) according to ASTM D2196-05.

In step C) the hydrosilylation reaction product of step B) is subject to shearing such as by way of stirring or by passing the hydrosilylation reaction product through a fast speed mixing device (e.g. Myers mixer, Drais mixer, pin mixer, rotor-stators, etc.) to reduce its viscosity and improve flowability. In a preferred embodiment, shear is applied to the hydrosilylation reaction product until its viscosity is reduced to a range of 40,000 to 500,000 cP measured at a shear rate of 1 s$^{-1}$ at 25° C. using a viscometer (Brookfield DV2-RV) according to ASTM D2196-05. In a preferred embodiment, step C) results in at least a 90% reduction in the viscosity as compared with the hydrosilylation reaction product resulting from step B.

In step D) the sheared hydrosilylation reaction product from step C) is combined with a silicone resin and a condensation catalyst to form a condensation reaction mixture and a condensation reaction is conducted between the silicone resin and the hydrosilylation reaction product to form a condensation reaction product. The condensation reaction may be conducted by mixing the silicone resin with the hydrosilylation reaction product while heating at elevated temperatures, e.g. 80 to 150° C., more preferably 95 to 120° C. Preferably the condensation catalyst is added after the condensation reaction mixture has been heated to an elevated temperature of at least 100° C. The reaction is typically conducted for at a least a few minutes up to a few hours, i.e. most typically about 30 minutes. Applicable silicone resins and condensation catalyst are described below with MQ resins and a KOH dispersion (aqueous or in solvent) being preferred. The silicone resin may be provided in a solvent such in a polydimethylsiloxane (PDMS) fluid, as is common in the art as described above. The amount of silicone resin combined with the hydrosilylation reaction product from step C) is not particularly limited but is typically from 1 to 20 wt %, but preferably from 2 to 10 wt % and more preferably from 2 to 5 wt % based upon the weight of the hydrosilylation reaction product (i.e. not including the weight attributed to any solvent). The amount of condensation catalyst is not particularly limited and can be determined based upon the specific catalyst used through routine experimentation. When KOH is used, it is preferred to pre-dissolve it in water or alcohol like methanol, ethanol or isopropanol at 20%; with a typically ranges is from 0.3 top 3% of such solution. The condensation reaction product resulting from step D) has a reduced viscosity as compared with the hydrosilylation reaction product resulting from step C), i.e. the viscosity of the condensation reaction product is preferably at least 25% less than that of the sheared hydrosilylation product from step C). The viscosity of the condensation reaction product of resulting from step D) may be from 10,000 to 100,000 cP but is preferably equal to or less than 100,000 cP, 60,000 cP, 50,000 cP, 40,000 cP, or even 30,000 cP at 25° C. Preferred viscosity ranges include from: 10,000 to 50,000 cP as measured with a Brookfield DVII, Spindle CP-52 at 1 RPM and 25° C. according ASTM D2196-05. The condensation reaction mixture may optionally include a polyorganosiloxane including one or more hydroxyl functional or hydrolysable groups. For example, polydiorganosiloxanes having at least one terminal silanol group are also well known and commercially available materials and may be represented by the general formula $R^a{}_3SiO—[Si(R)_2O]_n—Si\,R^a{}_3$ where R is monovalent hydrocarbon group as described above and $R^a$ is either a hydroxyl or an OR group.

(v) Silicone Resin:

As used herein, "silicone resin" refers to any organopolysiloxane containing at least one $(RSiO_{3/2})$ or $(SiO_{4/2})$ siloxy unit. Silicone resin are formed when a significant portion of the siloxy units are selected from T or Q siloxy units. Such resins can be represented as:

$(R^1R^2R^3SiO_{1/2})_w(R^4R^5SiO_{2/2})_x(R^6SiO_{3/2})_y(SiO_{4/2})_z,$ where $R^1$-$R^6$ are independently selected from R or R' groups as defined above, e.g. substituted or unsubstituted hydrocarbyl groups, alkoxy groups, and w, x, y and z are independently from $\geq 0$ to $\leq 1$, with the provisos that y and z are not simultaneously 0 and w+x+y+z=1. Subscript y indicates T siloxy units and subscript z indicates Q siloxy units. The amount of each siloxy unit present in the solid silicone resin is expressed as a mole fraction (through subscript w, x, y and z) of the total number of moles of all M, D, T, and Q siloxy units present in the silicone resin. The mole fractions of the various siloxy units in the silicone resin as well as the silanol content, if any, may be readily determined by $^{29}$Si NMR techniques. When an organopolysiloxane contains predominantly M and T siloxy units, it is often referred to as a "T resin" or "silsesquioxane resin". When M and Q siloxy units predominate, the resulting organosiloxane is often referred to as a "MQ resin." For purposes of the present invention, the silicone resin preferably comprises an MQ resin. The number ratio of M groups to Q groups is preferably in the range 0.4:1 to 2.5:1, more preferably 0.4:1 to 1.1:1 and most preferably 0.5:1 to 0.8:1. The resin may be a solid at room temperature but MQ resins having an M/Q ratio higher than 1.2, which are generally liquids, can also be used. Although it is most preferred that the resin consists only of monovalent and tetravalent siloxy units as defined above, a resin comprising M groups, T units and Q units can alternatively be used. It is also acceptable that up to 20% of all units present can be divalent units $R^4R^5SiO_{2/2}$ as defined above. Other hydrocarbon groups may be present, e.g. alkenyl groups present for example as dimethylvinylsilyl units, preferably not exceeding 5% of all R" groups. Silicon bonded hydroxyl groups and/or alkoxy, e.g. methoxy groups may also be present. Applicable resins can be made in solvent or in situ, e.g. by hydrolysis of certain silane materials. A particularly preferred methodology is the hydrolysis and condensation in the presence of a solvent e.g. xylene of a precursor of the tetravalent siloxy unit (e.g. tetraorthosilicate, tetraethyl orthosilicate, polyethyl silicate or sodium silicate) and a precursor of mono-valent trialkylsiloxy units (e.g. trimethylchlorosilane, trimethylethoxy silane, hexamethyldisiloxane or hexamethyldisilazane). The resulting MQ resin can be further trimethylsilylated to react out residual Si—OH groups or can be heated in the presence of a base to cause self-condensation of the resin by elimination of Si—OH groups. However, for purposes of the present invention, the resin preferably includes at least 0.5 wt % of Si-bonded hydroxyl or alkyoxy groups, e.g. from 1 to 10 by weight of free Si-bonded hydroxyl or alkoxy groups. These resins are a solid preferably delivered as a liquid in a solvent. The solvent can be polydimethylsiloxane (PDMS) with viscosity ranging from 50 cP to 1000 cP or an organic solvent, e.g. toluene, xylene, etc. The weight average molecular weight (Mw) these resins is preferably 200 to 200,000, more preferably 1000 to 20,000. Representative commercial examples of such resins include: DOWSIL™ MQ-1600 Solid Resin, DOWSIL™ 593 Fluid, DOWSIL™ 2-1912 Fluid, and DOWSIL™ 3527 Release Agent all of which are available from The Dow Chemical Company.

(vi) Condensation Catalyst:

Suitable condensation catalysts include alkali metal hydroxides, alkali metal alkoxides, alkali metal silanolates, quaternary ammonium hydroxides, quaternary phosphonium hydroxides and metal salts of organic acids for example tin, lead or zinc salts of such acids as dodecanoic acid, octanoic acid or acetic acid. Additional examples are described in U.S. Pat. No. 4,749,740 and EP0217501. A preferred alkali metal hydroxide catalyst is KOH. It is preferred to dissolve the condensation catalyst in an appropriate solvent like water or alcohol before its use to ensure better homogeneity of the reaction.

The foam control composition may optionally be combined with silicone polyether copolymer (SPE) materials such as those described in U.S. Pat. Nos. 3,784,479, 3,984,347, 4,983,316, 6,372,830, 6,512,015, 7,294,653, 9,777,121 and EP341952. Commercially available examples of applicable silicone polyethers include: DOWSIL™ OFX 5247 Fluid, DOWSIL™ OFX-5329 Fluid, DOWSIL™ OFX-5573 Fluid and DOWSIL™ 5290 Performance Modifier. Silicone polyethers can be linear, ABA type or rake and preferably partially crosslinked structures in which the polyether radicals are pendant SiC bonded to linear siloxane chains via hydrocarbon radicals, preferably divalent hydrocarbon radicals, and these linear siloxane chains are joined to one another via a siloxane bridges as described in US 2003/0013808.

Upon cooling of the condensation reaction mixture, optional components may be added to the mixture to facilitate subsequent formulation or processing, e.g. surfactants, thickeners, binders or carriers. Suitable surfactants may comprise a nonionic, cationic and amphoteric varieties, or a mixture of such surfactants. Preferably the nonionic surfactants are used. Suitable nonionic surfactants include: sorbitan fatty esters, ethoxylated sorbitan fatty esters, glyceryl esters, fatty acid, ethoxylates, alcohol ethoxylates e.g. (R'" $(OCH_2CH_2)_pOH$), particularly fatty alcohol ethoxylates and organosiloxane polyoxyethylene copolymers. Fatty alcohol ethoxylates typically contain the characteristic group $(OCH_2CH_2)_pOH$ which is attached to a monovalent fatty hydrocarbon residue R which contains about eight to about twenty carbon atoms, such as lauryl (C12), cetyl (C16) and stearyl (C18). While the value of "p" may range from 1 to about 100, its value is typically in the range of about 2 to about 40, preferably 2 to 24. Combination of such surfactants may be used. Additional examples of suitable nonionic surfactants include: polyoxyethylene (4) lauryl ether, polyoxyethylene (5) laurylether, polyoxyethylene (23) lauryl ether, polyoxyethylene (2)cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearylether, polyoxyethylene (21) stearyl ether, polyoxyethylene(100) stearyl ether, polyoxyethylene (2) oleyl ether, and polyoxyethylene (10) oleyl ether. These and other fatty alcohol ethoxylates are commercially available and include: ALFONICO, BRIJ, GENAPOL (S), NEODOL, SURFONIC, TERGITOL and TRYCOL brand surfactants. Ethoxylated alkylphenols may also be used, such as ethoxylated octylphenol, commercially available as TRITONS.

In yet another embodiment the foam control composition may optionally be combined with such constituents along with suitable surface-active agent (e.g. fatty acid esters, polyalkylene oxides, etc.) and optional thickening agents and water under shear to form an oil-in-water emulsion. Methods for preparing such emulsions are well known and are described in the literature. See for example U.S. Pat. Nos. 6,521,586 and 8,053,480. The subject foam control composition may be provided as a concentrate liquid, a self-dispersible concentrate formulation as described in U.S. Pat. Nos. 8,053,480 and 6,656,975, as a particulate or granular form as described in EP0636684, U.S. Pat. No. 6,165,968, US20130309498, EP0496510 or in any other well-known formulation as is well known for delivering foam control compositions.

The foam control compositions of the present invention can be used as any kind of foam control compositions, i.e. as defoaming agents and/or antifoaming agents. Defoaming agents are generally considered as foam reducers whereas antifoaming agents are generally considered as foam preventers.

The foam control compositions of the present invention find utility in various media such as inks, coatings, paints, detergents, including textile washing, laundry and auto dish washing, black liquor, and pulp and paper manufacture, wastewater treatment, textile dyeing processes, the scrubbing of natural gas. While applicable to most foam control applications including those involving aqueous systems, the subject foam control finds particular utility when the foaming system comprises highly acid or highly basic aqueous environments, such as those having a pH of less than about 3 or greater than about 12. This holds particularly for highly acidic or basic systems at elevated temperatures. Thus, for example, under the extremely harsh conditions encountered in paper pulp manufacture, wherein the aqueous foaming medium (Kraft® process "black liquor") has a pH of 12 to 14 and a temperature of 50° C. to 100° C., the foam control compositions of the present invention have been found to provide defoaming activity for considerably greater time periods (i.e. greater persistency) than antifoam agents of the prior art including those described in U.S. Pat. No. 8,053,480. They also have lower relative viscosities which facilitate further handling, formulation and/or use.

Unless otherwise indicated, the term "viscosity" refers to dynamic viscosity at 25° C. using a rotational cone-plate viscosimeter (Brookfield DVII, Spindle CP-52 @ 1 RPM) according ASTM D2196-05 and the terms "molecular weight" and "Mw" refer to the weight average molecular weight as measured by gel permeation chromatography (GPC).

Many embodiments of the invention have been described and, in some instances, certain embodiments, selections, ranges, constituents, or other features have been characterized as being "preferred." Such designations of "preferred" features should in no way be interpreted as an essential or critical aspect of the invention. Expressed ranges specifically include designated end points.

EXAMPLES

Unless otherwise indicated, all preparation and testing were conducted at room temperature (RT) at standard pressure (1 atm or 760 mm Hg). The following materials were used in the preparation of the samples:

Silicas: Sipernat™ D10/1, Aerosil™ R972, Sipernat™ FK-383, Sipernat™ 22S and Aerosil™ 200 all from Evonik. Condensation Catalyst: KOH 20% from VWR Chemicals. Emulsifiers: Brij™ S2 and Brij™ S20 surfactants from Croda. Thickeners: Keltrol™ RD and CP and Natrosol™ 250 LR from Ashland. Biocides: Kathon™ LXE from Dupont. Silicone polyether (SPE1): DOWSIL™ 5290 Performance Modifier having a viscosity of 12000 cP (Brookfield DVII, Spindle CP-52 @ 2.5 RPM) according ASTM D2196-05.

The methodology for preparing each sample foam composition, corresponding emulsion, foaming test solution and testing protocol are provided below:

20% foam control active emulsions are prepared as followed: 5.4 parts of the foam control compositions and 0.6 part of a silicone polyether SPE1 were placed in a Hauschild SpeedMixer™ receptacle. A mixture of 0.56 parts of Brij S2 and 0.56 parts of Brij 20 surfactants were preheated to 60° C. After heating at 70° C., the mixture was mixed for 30 seconds at 4500 RPM in the Hauschild SpeedMixer™, 4 parts of a thickener mixture of 0.77 parts of Keltrol RD, 2.36 parts of Natrosol 250LR, 0.1 parts of Kathon LXE and 96.77 parts of water were added and after 30 seconds of mixing, another 2.5 and 2.9 parts of the thickener mixture were added step-wise and mixed for 30 seconds. 13.5 parts of water was then added to form the final emulsion.

Foaming test solution: Softwood black liquor sampled obtained from a Finish Kraft Chemical pulp mill having 12.5% solid content (SCAN-N 22:96).

Foam control testing protocol: Emulsions (20%) of a series of foam control compositions were tested in a foam cell using softwood black liquor. To this effect 600 ml of the softwood black liquor was preheated at 90° C. and introduced in a graduated and thermostatically controlled glass cylinder having an inner diameter of 5 cm. This foaming liquid was circulated through a circulation pipe at a temperature adjusted to 89° C. The circulation flow rate was controlled using a MDR Johnson pump set up at a frequency of 50 Hz. When a foam height of 30 cm was reached, 120 µl of the emulsion of the tested foam control composition was injected in the liquid jet. The evolution of the foam height was monitored and recorded. The foam height was measured in cm over a sufficient period to allow the foam control composition to have exhausted its capacity, i.e. when a foam height of 28 cm had been reached again in the foam cell, and the time at which this occurred was measured as an indicator of the longevity of the foam control composition ("Persistence (P)") recorded in seconds (s).

Example 1

In order to demonstrate the impact of conducting step D) (i.e. post condensation reaction of hydrosilylation reaction product and silicone resin in the presence of a condensation catalyst), two sample foam control compositions were prepared in a substantial identical manner as described below; however, Comparative Sample 1 was not subject to step D), whereas Sample 1 was subject to step D) involving the condensation of a silicone resin and the hydrosilylation reaction product in the presence of a condensation catalyst. The samples were formulated as emulsions and tested in the foaming test solution as previously described.

Comparative Sample 1: A foam control composition was prepared by dispersing 3.5 part of Sipernat D10 in a mixture of 68.5 parts of a trimethylsiloxane end-blocked polydimethyl siloxane having a viscosity of 1000 cP, 28 parts of a dimethylvinylsiloxane end-blocked polydimethyl siloxane having a viscosity of 9000 cP (Brookfield DVII, Spindle CP-52 @ 2.5 RPM according ASTM D2196-05). 350 parts of such silica dispersion is mixed with 80 parts of trimethylsiloxane end-blocked polydimethyl siloxane having a viscosity of 1000 cP (Brookfield DVII, Spindle CP-52 @ 10 RPM according ASTM D2196-05), and 0.34 parts of a catalyst which was a chloroplatinic acid complex of divinyltetramethyldisiloxane diluted in 70% by weight of dimethylvinylsiloxy endblocked polydimethylsiloxane which may be prepared according to methods described in U.S. Pat. No. 3,419,593. The mixture is homogenized under mixing and heated at 60° C. and 4.3 parts here a 20% pre-dilution of a trimethylsiloxane end-blocked copolymer of dimethylsiloxane units and methylhydrogensiloxane units, having a viscosity of about 7 cP (using Oswald type capillary viscosimeter) according to ASTM D445 is and 0.3% of SiH groups in a trimethylsiloxane end-blocked polydimethyl siloxane having a viscosity of 1000 cP (Brookfield DVII, Spindle CP-52 @ 10 RPM according ASTM D2196-05) is added and mixed. The resulting gelled mixture was homogenized under shear forces and cooled.

Sample 1: Sample 1 was prepared using the same procedure as comparative sample 1 except that after the gelled mixture was formed and homogenized under shear, the temperature was raised up to 100° C. and 15 parts of a 25% mixture of silicone MQ resin having a molecular weight of about 13,000 and trimethyl siloxy end-groups and 75% of a trimethyl end-blocked polydimethyl siloxane having a viscosity of 1000 cP and 1.5 part of a 20% KOH solution in water was added. After 2 hours mixing at 100° C., the mixture was cool.

| Sample No. | Step D) | Viscosity (cP) | Persistence (s) |
|---|---|---|---|
| Comparative Sample 1 | No | 75000 | 370 |
| Sample 1 | Yes | 26000 | 400 |

As illustrated by the data presented above, the application of step D) resulted in a reduction in the viscosity of the foam control composition along with improved persistence (P).

Example 2

In order to demonstrate the impact of using hydrophobic silica, hydrophilic silica and combinations thereof, a series of sample foam control compositions were prepared and tested in a substantial identical manner as Sample 1 described above, except that various quantities of hydrophilic silica replaced all or portions of the hydrophobic silica used in Sample 1.

| Sample No. | Hydrophobic Silica Sipernat D10 | Hydrophilic Silica Sipernat FK 383 DS | Persistence (s) |
|---|---|---|---|
| Sample 1 | 100% | 0% | 400 |
| Sample 2 | 95% | 5% | 390 |
| Sample 3 | 90% | 10% | 470 |
| Sample 4 | 80% | 20% | 450 |
| Sample 5 | 50% | 50% | 430 |
| Sample 6 | 0% | 100% | 440 |

As illustrated by the data presented above, the use of combinations of hydrophobic and hydrophilic silica filler (i.e. samples 3, 4 and 5) showed improved persistence (P) over the sole use of hydrophobic silica (sample 1) and samples 3 and 4 showed improved persistence (P) over the sole use of hydrophilic silica (sample 6).

Example 3

In order to further demonstrate the impact of step D) i.e. conducting a condensation reaction between a resin and the sheared hydrosilylation reaction product of step C), two sample foam control compositions were prepared in a substantial identical manner as described below; however, with Comparative Sample 2, an MQ resin was added in step B followed by step C (shearing) and finally the addition of a condensation catalyst, whereas in Sample 7, the MQ resin and condensation catalyst were combined with the hydrosilylation reaction product of step C (shearing) and then subject to a condensation reaction as part of step D). The samples were formulated as emulsions and tested in the foaming test solution as previously described.

Comparative Sample 2: A foam control composition was prepared by dispersing a mixture of 3.15 parts of hydrophobic Sipernat D10 and 0.35 parts of hydrophilic Sipernat FK383DS in a mixture of 68.5 parts of a trimethylsiloxane end-blocked polydimethylsiloxane having a viscosity of 1000 cP and 28 parts of a dimethylvinylsiloxane end-blocked polydimethylsiloxane having a viscosity of 9000 cP. 350 parts of this mixture was then combined and mixed with 80 parts of trimethylsiloxane end-blocked polydimethylsiloxane having a viscosity of 1000 cP, 15 parts of a 25% mixture of silicone MQ resin having a molecular weight of about 13,000 and trimethyl siloxy end-groups and 75% of a trimethyl end-blocked polydimethylsiloxane having a viscosity of 1000 cP and 0.34 parts of a catalyst (a chloroplatinic acid complex of divinyltetramethyldisiloxane diluted in 70% by weight of dimethylvinylsiloxy endblocked polydimethylsiloxane prepared according to methods described in U.S. Pat. No. 3,419,593). The mixture was homogenized under mixing and heated at 60° C. and 4.3 parts of a 20% pre-dilution of a trimethylsiloxane end-blocked copolymer of dimethylsiloxane units and methylhydrogensiloxane units, having a viscosity of about 7 cP is and 0.3% of SiH groups in a trimethylsiloxane end-blocked polydimethylsiloxane having a viscosity of 1000 cP was added and mixed and homogenized under shear (step C). The mixture was then heated to 100° C. and 1.5 part of a 20% KOH solution in water was added. After 2 hours mixing at 100° C., the mixture was cooled.

Sample 7: Sample 7 was prepared using the same methodology as comparative sample 2 (using the same resin and condensation catalyst (KOH), except that the MQ resin and condensation catalyst (KOH) where added after step C) (shearing).

| Sample No. | Viscosity (cP) | Dosage 20% emulsion (μl) | Persistence (s) |
| --- | --- | --- | --- |
| Comp. Sample 2 | 24500 | 60 | 250 |
| Sample 7 | 27500 | 60 | 320 |

As illustrated by the data presented above, the mere inclusion of a silicone resin within the foam control composition did not provide the superior Persistence as when added as part of step C).

Example 4

In order to demonstrate the impact of conducting step D) (i.e. post condensation reaction of hydrosilylation reaction product and silicone resin in the presence of a condensation catalyst), a series of sample foam control compositions were prepared in a substantial identical manner as described below and then formulated as emulsions and tested in the foaming test solution as previously described.

Comparative Sample 3: Comparative sample 3 was prepared using the same methodology as comparative sample 1 except that a mixture (90:10 wt %) of hydrophobic silica Sipernat D10 (B1) and hydrophilic silica Sipernat 22S (L2) was used.

Sample 8: Sample 8 was prepared using the same methodology as comparative sample 3 except that after the gelled mixture was formed and homogenized under shear forces, the mixture was heated to 100° C. and 15 parts of a 25% mixture of silicone MQ resin having a molecular weight of about 13,000 and trimethyl siloxy end-groups and 75% of a trimethyl end-blocked polydimethylsiloxane having a viscosity of 1000 cP and 1.5 part of a 20% KOH solution in water was added. After 2 hours mixing at 100° C., the mixture was cooled.

Comparative Sample 4: Comparative sample 4 was prepared according to the same methodology as comparative sample 1, except that a mixture (90:10 wt %) of hydrophobic silica Aerosil R972 (B2) and hydrophilic silica Aerosil 200 (L3) was used.

Sample 9: Sample 9 was prepared according to the same methodology as comparative sample 4 except that after the gelled mixture was formed and homogenized under shear and then heated to 100° C. and 15 parts of a 25% mixture of silicone MQ resin having a molecular weight of about 13,000 and trimethyl siloxy end-groups and 75% of a trimethyl end-blocked polydimethyl siloxane having a viscosity of 1000 cP and 1.5 part of a 20% KOH solution in water is added. After 2 hours mixing at 100° C., the mixture was cooled.

| Sample No. | Wt. Ratio Silica (90:10) | Step D) | Viscosity (cP) | Persistence (s) |
| --- | --- | --- | --- | --- |
| Comp. Sample 3 | B1:L2 | No | 58000 | 400 |
| Sample 8 | B1:L2 | Yes | 22000 | 480 |
| Comp. Sample 4 | B2:L3 | No | >100000 | 310 |
| Sample 9 | B2:L3 | Yes | 53000 | 410 |

As illustrated by the data presented above, the application of step D resulted in a dramatic reduction in of viscosity of the foam control composition along with improved persistence (P).

The invention claimed is:

1. A method for making a foam control composition comprising a cross-linked polyorganosiloxane material including a dispersed silica filler, said method comprising the steps of:
    A) preparing a hydrosilylation reaction mixture by combining the following components:
        (i) silica filler,
        (ii) a polyorganosiloxane having at least two reactive substituents capable of addition reaction with component (iii) via hydrosilylation,
        (iii) a polyorganosiloxane having at least three reactive substituents capable of addition reaction with component (ii) via hydrosilylation, and
        (iv) a hydrosilylation catalyst;
    B) conducting a hydrosilylation reaction of components (ii) and (iii) until the reaction mixture at least partially gels to form a hydrosilylation reaction product; and
    C) shearing the hydrosilylation reaction product of step B);
    wherein the method is characterized by the step of:
    D) combining the hydrosilylation reaction product of step C) with a (v) silicone resin and an (vi) condensation catalyst to form a condensation reaction mixture and conducting a condensation reaction between the (v) silicone resin and the hydrosilylation reaction product of step C) to form a condensation reaction product.

2. The method of claim 1 wherein the hydrosilylation reaction mixture of step A) further includes a solvent.

3. The method of claim 1 wherein the foam control composition has a viscosity of equal to or less than 100,000 cP at 25° C.

4. The method of claim 1 wherein the foam control composition has a viscosity of equal to or less than 50,000 cP at 25° C.

5. The method of claim 1 wherein the silicone resin comprises an MQ resin.

6. The method of claim 1 wherein the condensation reaction mixture comprises from 5 to 10 wt % of the silicone resin.

7. The method of claim 1 wherein the silica filler comprises both hydrophobic silica and hydrophilic silica.

8. The method of claim 7 wherein the weight ratio of hydrophobic silica to hydrophilic silica is from 90:10 to 50:50.

9. The method of claim 7 wherein the silica filler comprises precipitated and fumed silica.

* * * * *